Feb. 4, 1969 M. P. LEPSELTER 3,426,252

SEMICONDUCTIVE DEVICE INCLUDING BEAM LEADS

Filed May 3, 1966

INVENTOR
M. P. LEPSELTER
BY
Arthur J. Torsiglieri
ATTORNEY

United States Patent Office 3,426,252

Patented Feb. 4, 1969

3,426,252
SEMICONDUCTIVE DEVICE INCLUDING BEAM LEADS

Martin P. Lepselter, New Providence, N.J., assignor to Bell Telephone Laboratories, Incorporated, New York, N.Y., a corporation of New York Continuation-in-part of application Ser. No. 331,168, Dec. 17, 1963. This application May 3, 1966, Ser. No. 547,381

U.S. Cl. 317—234 12 Claims

Int. Cl. H01l 3/00, 5/02

ABSTRACT OF THE DISCLOSURE

A semiconductive device includes a semiconductive wafer over which lies an insulating layer apertured to permit electrical connection to the wafer and electrical connection is made to the wafer by a plurality of multilayer beam lead assemblies, each of which comprises a contact portion overlying the insulating layer and an aperture therein to contact the wafer and a cantilevered terminal portion integral with the contact portion and of sufficient strength to provide mechanical support for the wafer.

This invention relates to semiconductive devices and more particularly relates to semiconductive devices which are provided with an integral contact and terminal assembly.

This invention is a continuation-in-part of my application Ser. No. 331,168 filed Dec. 17, 1963, now U.S. Patent No. 3,287,612, and is related to my applications Ser. Nos. 347,173, 388,039, and 440,782, filed Feb. 25, 1964, Aug. 7, 1964, and Mar. 18, 1965, respectively, and now U.S. Patent Nos. 3,271,286, 3,335,338 and 3,274,670, respectively.

With increasing progress in the semiconductive art, the size of the semiconductive element or wafer employed as the heart of semiconductive devices has tended to shrink. For example, now wafers ten mils square and five mils thick are not atypical. As canb e imagined, this has created a number of serious problems. It is difficult to provide a plurality of electrode connections to such a wafer, particularly, as is often the case, when all or several of the connections are to be made to the same surface. Additionally, the further handling of such wafers, such as their interconnection into circuits, also poses difficult problems.

One object of the present invention is the alleviation of such problems.

Another factor of increasing importance in semiconductor technology is the protection economically of the critical portions of the semiconductive wafer from hostile influences. With the decrease in cost of the semiconductive wafer portion of the semiconductive device, the cost of providing the desired protection has become a very significant part of the total cost of the device, and, accordingly it has become more important to achieve the desired protection economically. Additionally, in an effort to conserve space it is advantageous ordinarily to keep small the increase in bulk resulting from the protection measures employed. Naturally it is important that the economies in cost and size be realized without affecting adversely the protection afforded the device.

A related object of the invention is to achieve this end.

A feature of the present invention is an integral contact and terminal assembly, to be termed a beam lead, which simultaneously provides an electrical connection to the minute wafer and a terminal by which the device may be interconnected with other circuit elements, characterized in that the terminal has the form of a cantilevered beam extending out from an edge of the wafer and capable of providing mechanical upport to the wafer. An important advantage of this construction is that it makes the device readily adaptable for interconnection into a circuit board, such as a printed circuit board or a thin film circuit.

In a structure of this kind, it is important that the lead make a firm bond to the wafer and that it be amenable to ready interconnection with other circuit elements.

In the preferred embodiment of the invention in which the beam lead is associated with a silicon wafer which includes a protective surface oxide layer, the beam lead has a multilayer structure. In particular for achieving firm adhesion to the oxide layer, it is found advantageous to include a layer of a reactive metal proximate the oxide. Titanium has proved particularly well-suited from this standpoint both because of its adhesive characteristics and also because it appears to getter impurities from the oxide. Moreover for facilitating interconnection with other circuit elements it is found advantageous to utilize a noble metal for the outer layer. Gold has proven particularly well-suited for this role, paritcularly when the semiconductive device is to be connected to a standard printed circuit board which itself utilizes gold terminals. Moreover, if the beam lead is to be subjected to high temperatures in its life, it has been found advantageous to incorporate a barrier metal intermediate the titanium and gold layers to insure that the gold not penetrate to the silicon since this is generally undesirable. In such a case, a metal such as platinum has proven useful for this purpose.

The invention will be described particularly with reference to a junction transistor in which the emitter, base and collector connections each consists of a separate beam lead. The transistor comprises a silicon wafer appropriately diffused for the formation of emitter, base and collector zones and a silicone oxide coating appropriately apertured to permit separate connection to the three zones at a common surface.

The invention will be more fully understood from the following more detailed description taken in conjunction with the accompanying drawing in which.

Figure 1:
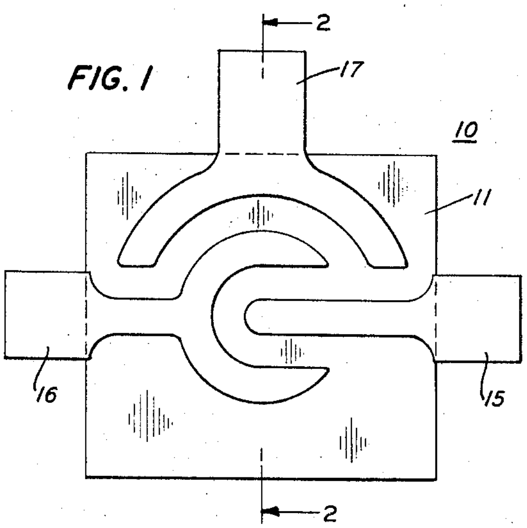
FIG. 1 is a plan view, partly schematic of a transistor in accordance with the invention.

Because some of the dimensions are so small, the drawing is not to scale.

Figure 2:
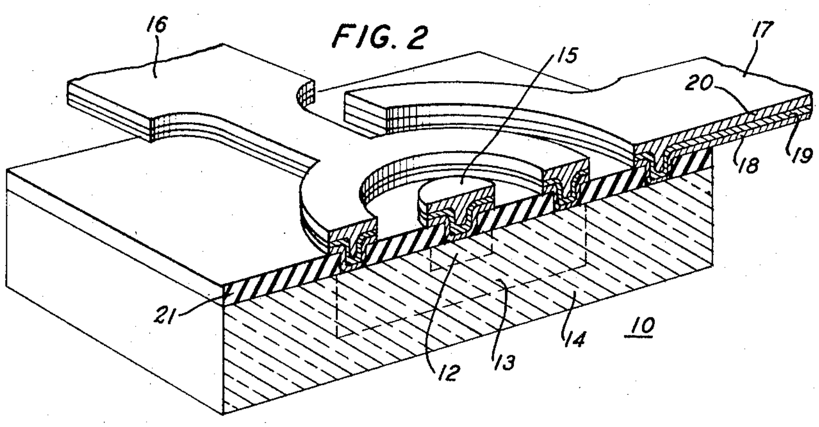
FIG. 2 is a section of the transistor shown in FIG. 1.

With reference now more specifically to the drawing, the NPN transistor 10 seen in FIGS. 1 and 2 comprises a silicon wafer 11 which includes emitter zone 12, base zone 13 and collector zone 14. The zones have the planar geometry known to workers in the art with the emitting and collecting junctions terminating on a common surface. This surface is provided with a protective silicon oxide coating 21, appropriately apertured to permit electrical connection to the various zones. Characteristically the wafer may be ten mils square and about five mils thick, and the oxide layer is 10,000 angstroms thick. Separate beam leads 15, 16 and 17 provide separate connections to the emitter, base and collector zones, respectively, by way of the apertures in the oxide layer. Each beam lead has a multilayer structure comprising a titanium layer 18 proximate the wafer, an intermediate platinum layer 19 and an outer gold layer 20. As is described in the parent application, it is advantageous for making a low resistance connection to the silicon to introduce a thin coating of platinum silicide between the silicon and the titanium but this is not shown. As is seen, each beam lead extends cantilevered out from the edge of the chip. Typical dimensions for the beam leads are as follows.

The emitter zone may be a dot about two mils in diameter and the opening in the oxide for the emitter contact may be a dot one mil in diameter. The base zone at the main surface may be a ring about two mils wide and the opening in the oxide for the base contact may be a stripe about a mil wide extending partially around the emitter. The collector contact is similarly made through an opening in the oxide overlying the collector zone. Of course, a variety of dimensions are feasible. The thicknesses of the titanium, platinum and gold layers are 1,000 angstroms, 5,000 angstroms and 120,000 angstroms, respectively. The terminal portions of the leads unsupported by the wafer are about one and one-half to three mils wide and extend beyond the edges of the wafer about three to eight mils.

The various dimensions recited of course are by way of example. However, in accordance with the invention, the dimensions of the extending portions are such that the leads can provide mechanical support for the wafer. Naturally, the larger and heavier the wafer, the thicker and stronger need be the terminals. However, it has usually proven advantageous to have such portions at least 100,000 angstroms thick and one and one-half mils wide to insure that the terminal will be sufficiently rigid. In particular with wafers whose dimensions are of the order of ten mils lead thicknesses of between $10^5$–$10^7$ angstroms and widths of between one–five mils are suitable.

In particular, typically the wafer will be connected with a circuit board, the circuit board being either of the conventional printed copper circuit type or alternatively of the so-called thin-film type comprising a conductive pattern which also includes resistive and/or capacitive elements.

Figure 3:
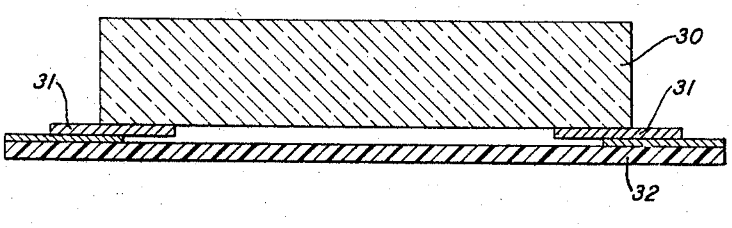
FIG. 3 shows a beam-leaded transistor connected to a circuit board.

FIG. 3 shows schematically a device of the beam-lead type interconnected with a circuit board. As can be seen, the semiconductive device 30 is connected by way of its beam leads 31 to the conductive pattern of the circuit board 32 such that the beam leaded face is proximate the circuit board whereby the device 31 is supported by its beam leads.

There may also be varied the constituents of the leads. In particular other combinations of metals are feasible. For example, if it is desired to improve the high temperature stability of the contact, zirconium may be substituted for the titanium. Alternatively, if high temperature stability is of little moment, the intermediate layer can be omitted.

Similarly, the invention is applicable for use with other forms of protective layers, such as silicon nitride, and other kinds of semiconductive material such as germanium. In a suitable system, it may be feasible to employ a single metallic layer for the beam lead, such as an aluminum layer.

A typical process for the fabrication of a beam lead device is as follows.

First, a relatively large slice of silicon is treated to provide therein a pattern of P-N junctions such that the slice may be subdivided to provide a plurality of individual elements each of which has the planar geometry characteristic of the wafer shown in FIG. 1. Moreover the main face of the slice has thereover a layer of silicon oxide appropriately apertured so that electrical connection can be made to the various zones of the individual elements. Up to this point, the process represents well known practice.

Thereafter a thin layer of platinum is sputtered over the main face of the slice and the slice heated briefly to sinter the platinum with the silicon to form islands of platinum silicide at the openings in the oxide. The platinum does not react with the oxide and so the platinum falling on the oxide is readily removed by rinsing in aqua regia.

Subsequently thin layers of titanium and platinum are sputtered in turn over the main face to form layers 18 and 19 as seen in FIG. 2.

Then by conventional photoresist masking techniques, there is formed an insulating mask over the surface having openings corresponding to the beam lead pattern desired as seen in FIG. 1. Thereafter the metal coating at regions exposed in the mask corresponding to the beam leads are selectively built by electroforming with gold. Then after removal of the mask, the metal coating not protected by the gold is removed by a back sputtering technique as described in my copending application Ser. No. 347,173, filed Feb. 25, 1964, now U.S. Patent 3,271,286. Then another layer of insulation is provided over the surface for additional protection but removed selectively at regions of the beam leads to be used for interconnection purposes. Then the slice is turned over and a suitable mask is provided on the back surface.

An etching treatment is then used to separate the slice into individual transistors, each including its own set of beam leads. The unsupported terminal portions of the beam leads correspond to places where the underlying semiconductive material was completely removed.

It is characteristic of a beam lead formed in this way that it forms an integral contact and terminal assembly, the terminal being a ribbon-like conductor extending cantilevered out from the edge of the wafer coplanarly with the top surface of the wafer. Moreover, each terminal is of sufficient strength to provide complete mechanical support for the wafer.

In some instances it may be desirable to treat the slice in such a fashion that the subsequent dicing thereof will leave individual wafers which include combinations of circuit elements, as is characteristic of integrated circuit techniques.

It is of course feasible to achieve the desired beam lead structure in other ways. For example, an alternative fabrication technique is described in application Ser. No. 512,045, filed Dec. 7, 1965 (Szabo Case 1), now U.S. Patent 3,388,048, having the same assignee as this application.

Accordingly, it is to be understood that various modifications are possible in the embodiment described without departing from the spirit and scope of the invention. For example, it should be obvious that the principles can similarly be used to provide beam leads to diodes or wafers including combinations of circuit elements.

What is claimed is:

1. A semiconductive device comprising
   a semiconductive wafer
   an insulating layer extending over a surface of the wafer and including at least one opening therein for permitting electrical connection to the wafer, and
   a beam lead assembly comprising
   a contact portion overlying said insulating layer and said opening for making electrical connection to the wafer, and
   a cantilevered terminal portion integral with said contact portion, said terminal portion having sufficient strength to provide mechanical support for the wafer.

2. A semiconductive device in accordance with claim 1 characterized in that
   the beam lead assembly has a multilayer structure.

3. A semiconductive device in accordance with claim 2 characterized in that
   the wafer is of silicon,
   the insulating layer is of silicon oxide,
   and the multilayer structure includes a layer of titanium proximate the wafer, an intermediate layer of platinum and an outer layer of gold.

4. A semiconductive device in accordance with claim 2 in which the multilayer structure comprises layers of zirconium, platinum and gold.

5. A semiconductive device according to claim 2 in which the multilayer structure comprises layers of titanium and gold.

6. A semiconductive device in accordance with claim 1 in which the wafer dimensions are of the order of magnitude of ten mils and the terminal portion of the beam lead has a thickness of between $10^5$ and $10^7$ angstroms and a width of between one and five mils.

7. In combination, a semiconductive device in accordance with claim 1 and a circuit board the wafer being mounted on the circuit board with the beam lead assembly proximate the circuit board.

8. A junction transistor in accordance with claim 1 in which a separate beam lead assembly makes electrical connection to each of the emitter, base and collector zones at a common surface.

9. A silicon junction transistor in accordance with claim 8 further characterized in that the insulating layer is of silicon oxide and each beam lead assembly has a multilayer structure.

10. In combination, a circuit board and a silicon junction transistor in accordance with claim 9, the transistor being mounted on the circuit board with the beam lead assemblies proximate the circuit board.

11. A semiconductive device in accordance with claim 1 in which the insulating layer is from the group consisting of silicon oxide and silicon nitride.

12. A semiconductive device comprising:

a silicon wafer;

an insulating layer taken from the group consisting of silicon oxide and silicon nitride over a surface of the wafer and including at least one opening therein for permitting electrical connection to the wafer and at least one multilayer beam lead assembly comprising a contact portion overlying said insulating layer and said opening for making electrical connection to the wafer;

and a cantilevered terminal portion integral with said contact portion, said terminal portion having a thickness of between $10^5$ and $10^7$ angstroms and a width of between one and five mils and extending beyond the edge of the wafer at least three mils.

References Cited

UNITED STATES PATENTS

| | | | |
|---|---|---|---|
| 3,287,612 | 11/1966 | Lepselter | 317—235 |
| 3,335,338 | 8/1967 | Lepselter | 317—234 |
| 3,256,465 | 6/1966 | Weissenstern et al. | 317—101 |
| 3,292,240 | 12/1966 | McNutt et al. | 29—155.5 |

FOREIGN PATENTS

| | | |
|---|---|---|
| 6,413,364 | 11/1964 | Netherlands. |

JOHN W. HUCKERT, *Primary Examiner.*

R. SANDLER, *Assistant Examiner.*

U.S. Cl. X.R.

317—235